(12) United States Patent
Torrington et al.

(10) Patent No.: US 10,864,680 B2
(45) Date of Patent: Dec. 15, 2020

(54) METHOD FOR FABRICATING INTEGRATED HEAT PIPES VIA ADDITIVE MANUFACTURING

(71) Applicant: BAE SYSTEMS INFORMATION AND ELECTRONIC SYSTEMS INTEGRATION INC., Nashua, NH (US)

(72) Inventors: Geoffrey K. Torrington, Oakton, VA (US); Michael J. Shaw, Centreville, VA (US); Michael P. Mitchell, Epsom, NH (US); Timothy Whalen, Manassas, VA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 164 days.

(21) Appl. No.: 16/189,749

(22) Filed: Nov. 13, 2018

(65) Prior Publication Data

US 2020/0147890 A1 May 14, 2020

(51) Int. Cl.
| | |
|---|---|
| *B29C 64/393* | (2017.01) |
| *F28D 15/04* | (2006.01) |
| *F28F 7/00* | (2006.01) |
| *H05K 7/20* | (2006.01) |
| *G06F 30/17* | (2020.01) |
| *B33Y 40/00* | (2020.01) |
| *B33Y 50/02* | (2015.01) |
| *B33Y 80/00* | (2015.01) |
| *B33Y 10/00* | (2015.01) |
| *G06F 119/08* | (2020.01) |

(52) U.S. Cl.
CPC .......... *B29C 64/393* (2017.08); *F28D 15/046* (2013.01); *F28F 7/00* (2013.01); *G06F 30/17* (2020.01); *H05K 7/20336* (2013.01); *B33Y 10/00* (2014.12); *B33Y 40/00* (2014.12); *B33Y 50/02* (2014.12); *B33Y 80/00* (2014.12); *F28F 2255/00* (2013.01); *G06F 2119/08* (2020.01)

(58) Field of Classification Search
None
See application file for complete search history.

(56) References Cited

U.S. PATENT DOCUMENTS 5,510,066 A * 4/1996 Fink ...................... B29C 64/112
264/40.1
2018/0305266 A1* 10/2018 Gibson .................... B22F 7/06

* cited by examiner

*Primary Examiner* — Carlos R Ortiz Rodriguez
(74) *Attorney, Agent, or Firm* — Antony P. Ng; Russell Ng PLLC; Scott J. Asmus

(57) ABSTRACT

A method for fabricating an integrated heat pipe is disclosed. The integrated heat pipe includes a porous wick structure, a solid conducting structure, and an integrated part. In a CAD model, the porous wick structure is represented as a simple solid having a finite amount of mechanical interference; the solid conducting structure and the integrated part are represented as simple solids. After incorporating the CAD model into a 3D-printer build file, 3D-printer parameters representing the porous wick structure of the integrated heat pipe are assigned to a porous region component model within the 3D-printer build file, and standard 3D-printer parameters representing the solid conducting structure and the integrated part are assigned to a solid region component model within the 3D-printer build file. The 3D-printer build file is utilized to print the integrated heat pipe on a 3D printer.

11 Claims, 5 Drawing Sheets

METHOD FOR FABRICATING INTEGRATED HEAT PIPES VIA ADDITIVE MANUFACTURING

TECHNICAL FIELD

The present invention relates to heat transfer systems in general, and in particular to a method for fabricating an integrated heat pipe via additive manufacturing.

BACKGROUND

Thermal management is a key consideration when designing electronic systems. Thermal loads and boundary conditions are the primary factors that drive the design of a thermal management scheme for an electronic system. Boundary conditions are most often derived by the operational environment and vary greatly across terrestrial, aerial, underwater, and space applications. Regardless of the operational environment, electronic components have a specific operating temperature range limit that should not be exceeded, and a thermal management system is responsible for ensuring that the above-mentioned component-level limits will not be exceeded throughout the operational lifetime of the electronic components. Thus, electronic components often need to be efficiently cooled, but sometimes heated as well.

Heat pipes and vapor chambers are often employed for high heat flux electronics applications. Heat pipes and vapor chambers are passive, closed-cycle thermal transfer devices that rely on the principles of both thermal conductivity and phase transition to efficiently transfer heat between a thermal load (i.e., hot side or evaporator) and heat sink (i.e., cold side or condenser). At the evaporator, heat is conducted from the thermal load through the solid exterior of the heat pipe to a liquid contained within. After absorbing the heat, the working fluid undergoes a phase transition to the vapor state and is transported through an open cavity along the length of the heat pipe. After contacting the interior surfaces of the condenser, the vapor undergoes another phase transition back to liquid, thereby releasing the latent heat of vaporization through the heat sink. The liquid then returns to the evaporator through either capillary, gravitational, or centrifugal forces, for the process to repeat itself. Heat pipes and vapor chambers are passive devices that do not require input mechanical or electrical energy to operate. Due to the significantly high heat transfer coefficients associated with the phase transition processes, heat pipes are very effective thermal conductors, exhibiting effective thermal conductivities which can be orders of magnitude higher than the best solid conductors like copper and carbon composites.

Although traditional heat pipes are very effective thermal management devices, there are several complications and limitations of integrating them into a packaged electronic system. Traditional manufacturing methods require multiple independent processing steps and severely limit final geometry possibilities. In addition, the final geometry is almost always custom made for a particular application and is assembled onto the exterior of the associated thermal load and heat sink, which prevents the possibility to imbed the heat pipes within the bulk of a solid structure. As such, thermal efficiency losses are prevalent at the interface between the heat pipe and the thermal loads or sinks to which it is attached due to low conductivity interface materials or non-ideal mating surface roughness.

Consequently, it would be desirable to provide an improved method for fabricating heat pipes.

SUMMARY

In accordance with one embodiment of the present disclosure, a computer-aided design (CAD) model of an integrated heat pipe is provided. The integrated heat pipe includes a porous wick structure, a solid conducting structure, and an integrated part. In the CAD model, the porous wick structure is represented as a simple solid having a finite amount of mechanical interference. On the other hand, the solid conducting structure and the integrated part having a solid region and a porous region are represented as simple solids. After incorporating the CAD model into a 3D-printer build file, 3D-printer parameters representing the porous wick structure of the integrated heat pipe are assigned to a porous region component model within the 3D-printer build file, and standard 3D-printer parameters representing the solid conducting structure and the integrated part are assigned to a solid region component model within the 3D-printer build file. The 3D-printer build file is then utilized to print the integrated heat pipe on a 3D printer.

The features and advantages described herein are not all-inclusive and, in particular, many additional features and advantages will be apparent to one of ordinary skill in the art in view of the drawings, specification and claims. Moreover, it should be noted that the language used in the specification has been selected principally for readability and instructional purposes and not to limit the scope of the inventive subject matter.

BRIEF DESCRIPTION OF THE DRAWINGS

The invention itself, as well as its modes of use, further objects, and advantages thereof, will best be understood by reference to the following detailed description of an illustrative embodiment when read in conjunction with the accompanying drawings, wherein.

DETAILED DESCRIPTION

Figure 1:
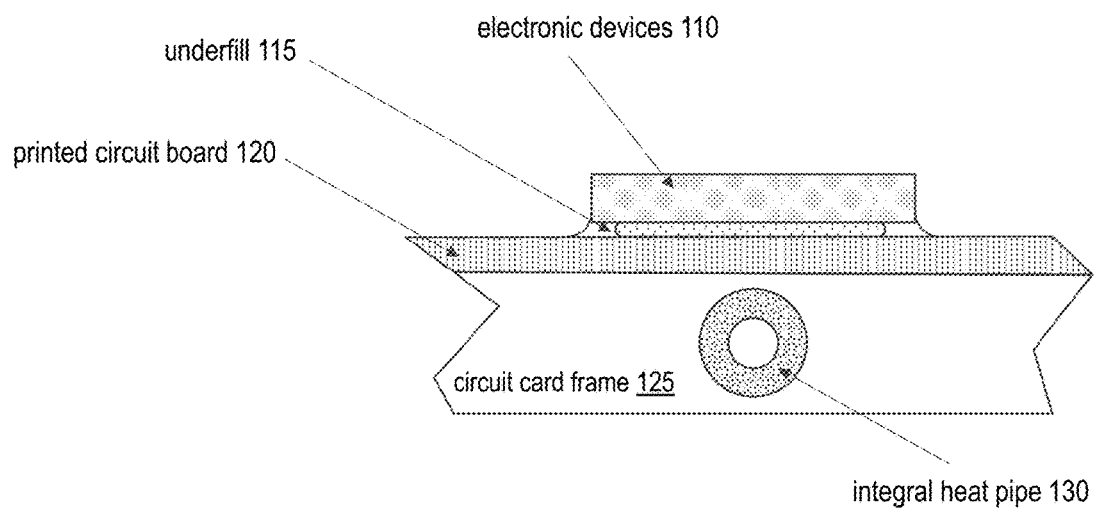
FIG. 1 is cross-sectional diagram of a circuit card frame having an integrated heat pipe, in accordance with one embodiment.

Referring now to the drawings and in particular to FIG. 1, there is illustrated a cross-sectional diagram of a circuit card frame having an integrated heat pipe, according to one embodiment. As shown, a circuit card assembly module includes multiple electronic devices 110 mounted on top of a printed circuit board 120 via an underfill 115. Printed circuit board 120 is attached to a circuit card frame 125 having an integrated heat pipe 130. Electronic devices 110 include multiple electronic components that are made of silicon. Printed circuit board 120 is made of a fiberglass composite laminate that is well known in the art. Integrated heat pipe 130 is designed to transfer heat away from high heat flux components within electronic devices 110 to conductive paths located at the edges of circuit card frame 125.

Figure 2:
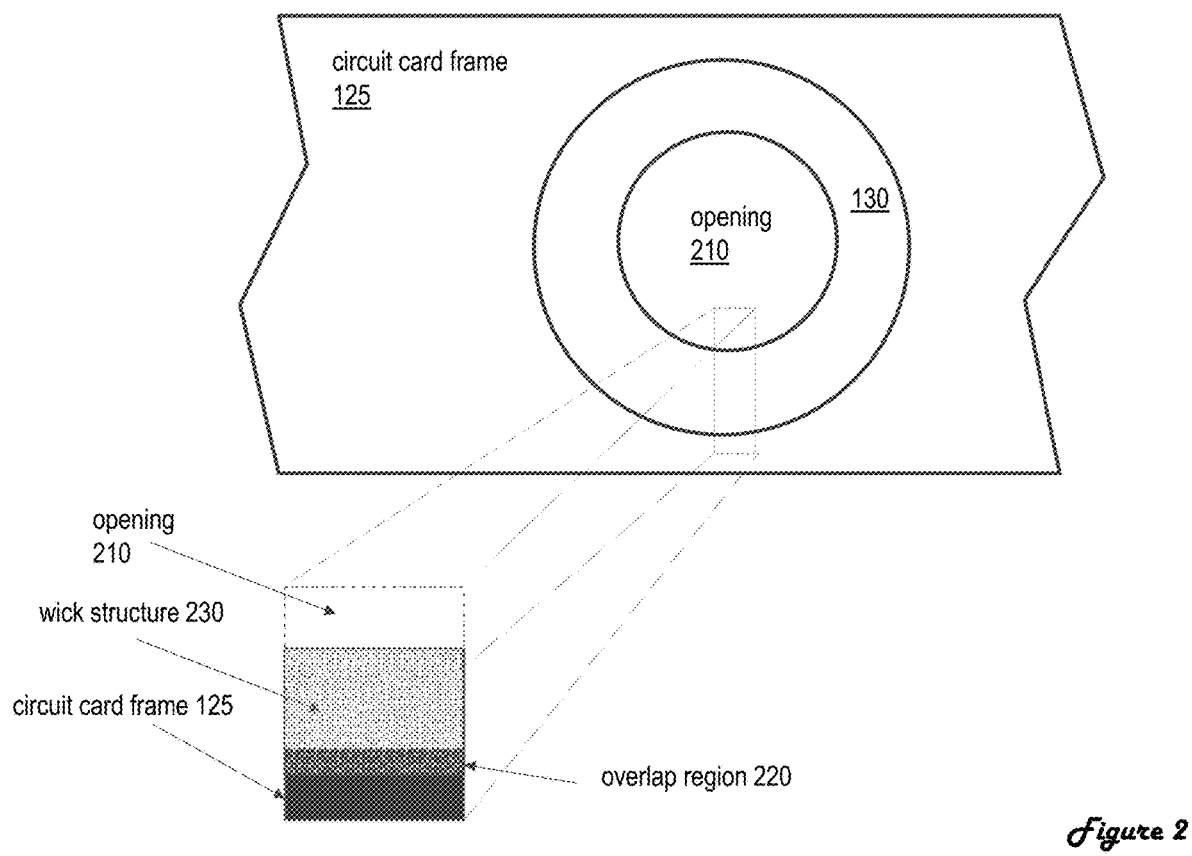
FIG. 2 is an enlarged view of the integrated heat pipe from FIG. 1.

With reference now to FIG. 2, there is illustrated an enlarged view of integrated heat pipe 130. As shown, integrated heat pipe 130 is circular in shape with an opening 210 located in the center for fluid to pass through. Integrated heat pipe 130 is formed by a wick structure 230 integrated into part of circuit card frame 125 with an overlap region 220.

Figure 3:
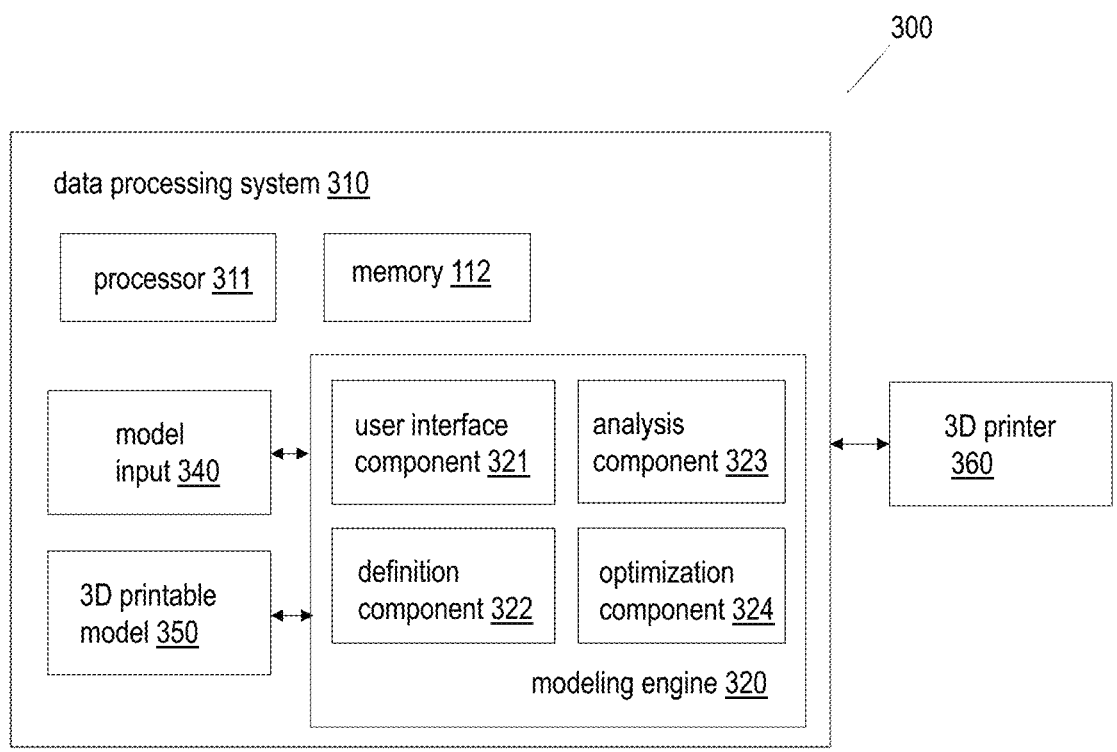
FIG. 3 is a block diagram of an apparatus for fabricating the integrated heat pipe from FIG. 2, in accordance with one embodiment.

Referring now to FIG. 3, there is illustrated a block diagram of an apparatus for fabricating integrated heat pipe 130, in accordance with one embodiment. As shown, an apparatus 300 includes a data processing system 310 and a three-dimensional (3D) printer 360. Data processing system 310 includes a processor 311, a memory 312 and a modeling engine 320 that is connected to a model information input 340 and a 3D printable model 350. Users can access data processing system 310 via input/output devices such as a keyboard, a mouse and a display (not shown).

In the present embodiment, modeling engine 320 includes an user interface component 321, a definition component 322, an analysis component 323, an optimization component 324. Users can select from a library of component parts rendered in user interface component 321 to assemble their own models. Users can also select and customize the library parts in user interface component 321. Each part is defined such that users can readily modify its dimensions, appearance, etc., based on modification on one or more dimensions. Furthermore, data processing system 300 can automatically maintain printability of the modified piece by recalculating the various dimensions according to the definitions in response to changes entered in user interface component 321. After a heat pipe model has been generated within 3D printable model 350, a heat pipe can be printed via 3D printer 360.

Figure 4:
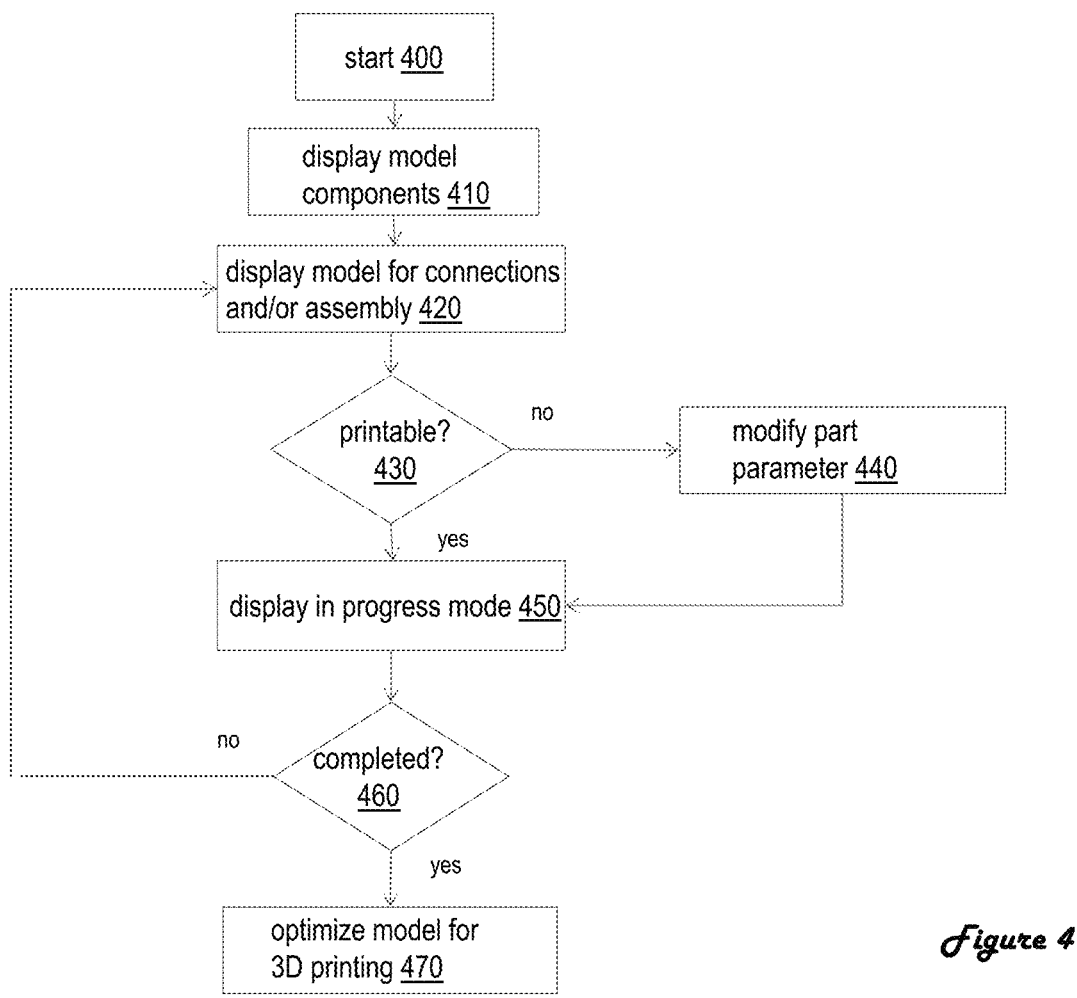
FIG. 4 is a process flow diagram of a method for generating 3D printable models of the integrated heat pipe from FIG. 2, according to one embodiment.

With reference now to FIG. 4, there is depicted a process flow diagram of a method for generating multiple 3D printable models of integrated heat pipe 130, according to one embodiment. Starting at block 400, a modeling environment and selectable model components are displayed, as shown in block 410. Model components can be selected for display in response to a user selection of a complete visual model of integrated heat pipe 130. The components that make up the complete model can then be displayed on a build screen. Component parts can be dragged and dropped on to a build screen display of a user interface. In response to a user selection of one or more component parts, an in-progress model can be displayed so that a user can connect various components, insert new components into an assembly of parts, and/or modify the displayed components, as depicted in block 420. A connection and/or assembly is evaluated to determine whether or not the connections and/or assembly will be printable, as shown in block 430. If a connection and/or modification results in a non-printable configuration, the part, connection, and/or parameters is automatically modified to fall within printable ranges, as depicted in block 440. For example, parts and/or respective connections can be broken up into multiple parts or pieces to ensure printability. Iterative versions of a model are displayed, for example, as new parts are added, modified and/or removed.

As new parts are added and their configuration are determined to be printable, the resulting model can be displayed, as shown in block 450. The steps of displaying the model for connections and/or assembly and displaying the model in progress can be repeated for each new part and/or modification made to a visual display. If a user has not finished assembling a model at block 460, the process returns to block 420 until the visual model is completed at block 460. After the visual model has been completed at block 460, the component parts that need to be printed to assemble the physical model, can be optimized for 3D printing, as shown in block 470. Further, singular parts in the visual model can be broken up into multiple components for printing as physical pieces to ensure that the print specifications of a 3D printer, such as 3D printer 360 from FIG. 3, are not exceeded.

Figure 5:
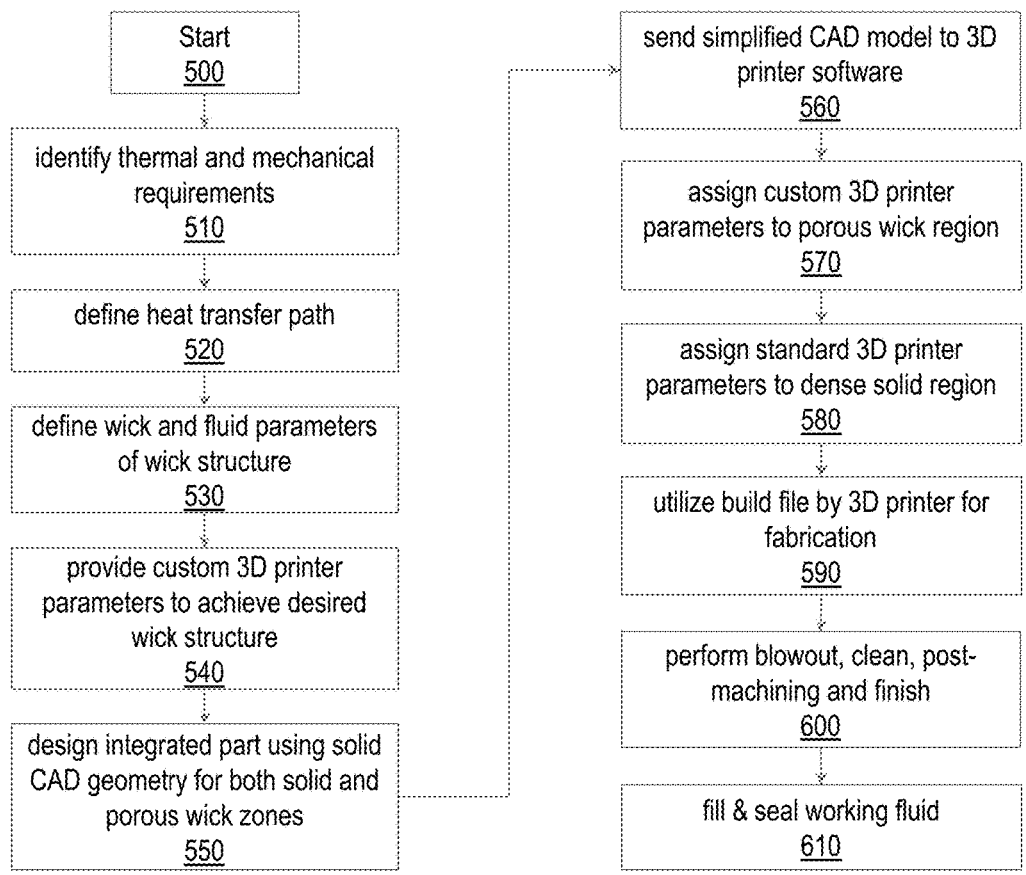
FIG. 5 is a process flow diagram of a method for fabricating the integrated heat pipe from FIG. 2, according to one embodiment.

Referring now to FIG. 5, there is illustrated a process flow diagram of a method for fabricating integrated heat pipe 130, according to one embodiment. Starting at block 500, thermal and mechanical requirements of integrated heat pipe 130 are initially identified, as shown in block 510. The thermal and mechanical requirements include mechanical package outline, keep-out areas, environmental requirements, thermal flux, heat source interface, and heat sink interface.

A heat transfer path is then defined, as depicted in block 520. The heat transfer path includes a heat conductive mechanical structure, such as circuit card frame 125 in FIGS. 4-5, that complies with all mechanical, environmental, and interface requirements. Next, wick and fluid parameters of a wick structure, such as wick structure 230 in FIG. 2, are defined, as shown in block 530. The wick structure, which is entirely contained and integrated within the conductive mechanical structure, should comply with all thermal requirements. Adjustable parameters may include central void fraction, wick fraction, wick density, and working fluid. Most of these parameters are allowed to be varied spatially throughout the wick structure.

After the desired wick structure has been determined based on thermo-structural requirements, different formulae for the porous wick structure on a 3D printer (such as 3D printer 360 in FIG. 3) are developed, as depicted in block 540. It can be done by, for example, altering the machine parameters from their standard settings that are utilized to make dense solid parts. The targeted performance parameter is wick density. For example, the primary adjustable parameters on a powder-bed fusion 3D printer may include: layer thickness, hatch spacing, scan speed, source power, scan direction, scan vector length, contour beam offset, and focus offset. It is permissible for many of the 3D print process parameters to spatially vary throughout each layer of the component design in the additive manufacturing process, thereby resulting in a single component with spatially varying density/porosity throughout the entirety of the component.

The integrated part, such as overlap region 220 in FIG. 2, is designed, as shown in block 550. The integrated part may include the solid conducting structure (i.e., circuit card frame 125 in FIG. 2) and the porous wick structure (i.e., wick structure 230 in FIG. 2). The conducting structure and the wick structure are two distinctly different regions represented as simple solids within a computer-aided design (CAD) modeling program. The two different regions are modeled with a finite amount of mechanical interference between them, ensuring strong adhesion of features and monolithic structure following the additive manufacturing process. Instead of explicitly defining the extremely complex geometry of a functional micro wick structure in the CAD model, the wick structure is digitally modeled as a solid entity in order to eliminate the need for immense computational resources.

A simplified digital CAD model, represented as an inseparable assembly of multiple individual solid component models, is digitally transferred to the 3D-printer build set-up software, as depicted in block 560. Within this software environment, various 3D printer parameter sets can be applied to different component models within the same build run. The machine parameters developed in block 540 are now assigned to their respective porous region component models, as depicted in block 570. Standard, fully dense, machine settings are assigned to all component model regions that are to remain fully solid in the final hardware part, as depicted in block 580.

After all of the individual regions of the monolithic, inseparable assembly have been assigned individual 3D printer process parameter sets, the build file is utilized by the 3D printer for printing integrated heat pipe 130, as shown in block 590. Integrated heat pipe 130 is built up layer-by-layer, where each layer represents a cross-sectional slice of the CAD model. Material is administered or excluded on each layer as defined by the original simplified CAD model in accordance with the custom-assigned printer parameter sets for each regional zone.

The transferred metadata, which contains the different machine parameter sets assigned to each of the multiple regions of the part, is what results in a single monolithic part with multiple regions of varying porosity. This metadata requires far less computational resources than explicitly defining the desired end result porous wick geometry in a conventional CAD file and printing the entire part on the standard solid machine settings. As a result, several problems that often arise in the generation, digital transfer process, and storage of large amounts of data can be eliminated.

It is understood by those skilled in the art that the 3D printer (such as 3D printer 360) can be located remotely from the data processing system (such as data processing system 310). After integrated heat pipe 130 has been printed on the 3D printer, post-processing can be performed, as depicted in block 600. During post-processing, remaining particles inside integrated heat pipe 130 can be evacuated through a combination of various standard procedures. After standard additive manufacturing post-processing has been completed, a finish can be applied to integrated heat pipe 130.

Finally, fill and seal are performed on the heat pipe, as shown in block 610. Under vacuum, integrated heat pipe 130 is back-filled with the exact volume of working fluid. Subsequently, integrated heat pipe 130 is hermetically sealed using standard procedures.

As has been described, the present invention provides an improved method for fabricating integrated heat pipes to be utilized with mechanical structure for the thermal management of electronic devices that can be employed in terrestrial, aerial, underwater and space applications.

While the invention has been particularly shown and described with reference to a preferred embodiment, it will be understood by those skilled in the art that various changes in form and detail may be made therein without departing from the spirit and scope of the invention.

What is claimed is:

1. A method for fabricating an integrated heat pipe, said method comprising:
   providing a computer-aided design (CAD) model of a thermal management structure with an integrated heat pipe, wherein said integrated heat pipe includes a porous wick structure, a solid conducting structure, and an overlapping region, wherein said overlapping region includes both said porous wick structure and said solid conducting structure;
   representing said porous wick structure in said CAD model as a first simple solid;
   representing said solid conducting structure in said CAD model as a second simple solid;
   representing said overlapping region in said CAD model as a volume which includes both said porous wick structure and said solid conducting structure;
   incorporating said CAD model to a 3D-printer build file;
   assigning a plurality of customizable 3D-printer parameters representing said porous wick structure of said integrated heat pipe to a porous region component model within said 3D-printer build file;
   assigning standard default 3D-printer parameters representing said solid conducting structure and said overlapping region to a solid region component model within said 3D-printer build file; and
   printing said integrated heat pipe on a 3D printer using said 3D-printer build file.

2. The method of claim 1, wherein said method further includes providing a finish on said integrated heat pipe.

3. The method of claim 1, wherein said method further includes filling and sealing said integrated heat pipe.

4. The method of claim 1, wherein said printing is performed at a location away from where said CAD model is provided.

5. The method of claim 1, wherein said CAD model is represented as an inseparable assembly of multiple individual solid component models.

6. The method of claim 1, wherein said overlapping region provides adhesion between said solid conducting structure and said porous wick structure.

7. The method of claim 1, wherein said porous wick structure is modeled as said first simple solid instead of a geometry of a micro wick structure.

8. An apparatus for fabricating an integrated heat pipe, said apparatus comprising:
   a data processor system having
      a computer-aided design (CAD) model of an integrated heat pipe, wherein said integrated heat pipe includes a porous wick structure, a solid conducting structure, and an overlapping region, wherein said overlapping region includes said porous wick structure and said solid conducting structure;
      a modeling engine wherein
         said porous wick structure is represented in said CAD model as a first simple solid; and
         said solid conducting structure is represented in said CAD model as a second simple solid; and
      a processor
         incorporates said CAD model to a 3D-printer build file;
         assigns a plurality of 3D-printer parameters representing said porous wick structure of said integrated heat pipe to a porous region component model within said 3D-printer build file;
         assigns standard 3D-printer parameters representing said solid conducting structure and said overlapping region to a solid region component model within said 3D-printer build file; and
      a 3D printer for printing said integrated heat pipe using said 3D-printer build file.

9. The apparatus of claim 8, wherein said CAD model is represented as an inseparable assembly of multiple individual solid component models.

10. The apparatus of claim 8, wherein said 3D printer is located away from said processor.

11. The apparatus of claim 8, wherein said overlapping region provides adhesion between said solid conducting structure and said porous wick structure.

\* \* \* \* \*